United States Patent [19]

Wreede

[11] Patent Number: 4,789,211

[45] Date of Patent: Dec. 6, 1988

[54] HOLOGRAM STABILIZING ASSEMBLY AND METHOD

[75] Inventor: John E. Wreede, Monrovia, Calif.

[73] Assignee: Hughes Aircraft Company, Los Angeles, Calif.

[21] Appl. No.: 14,752

[22] Filed: Feb. 13, 1987

[51] Int. Cl.[4] ............................ G03G 1/78; G03H 1/04
[52] U.S. Cl. ......................................... 350/3.61; 430/1
[58] Field of Search ........................ 350/3.61; 430/1, 2

[56] References Cited

U.S. PATENT DOCUMENTS

| | | | |
|---|---|---|---|
| 4,318,970 | 3/1982 | Kurland et al. | 430/1 |
| 4,330,604 | 5/1982 | Wreede et al. | 430/2 |

Primary Examiner—Bruce Y. Arnold
Assistant Examiner—Terry S. Callaghan
Attorney, Agent, or Firm—Leonard A. Alkov; A. W. Karambelas

[57] ABSTRACT

The holograph assembly has first and second hydrophobic substrates layers (14, 12) which carry therebetween a water absorbent layer (16). The holographic image layer (18) is protected against moisture from that side because the water absorbent layer acts as a sponge for the moisture diffusing through the first substrate (14). The upper side of the image layer is protected by first and second cover layers (20, 22) and second water absorbent cover layer (24), all of which must be transparent to view the holographic image. An adhesive may be applied between layers.

20 Claims, 1 Drawing Sheet

HOLOGRAM STABILIZING ASSEMBLY AND METHOD

BACKGROUND OF THE INVENTION

This invention is directed to an assembly including a dichromated gelatin hologram with layers on each side of the hologram which inhibit moisture penetration to the hologram layer to protect it to provide a long life.

Present-day holographic emulsions are dichromated gelatin film. Gelatin is highly hydrophilic, and when water is absorbed by the dichromated gelatin film, the moisture causes the film to swell. The swelling changes the wavelength of reflection type holograms and can lower the efficiency of both transmission and reflection holograms. Therefore, it is desirable to protect the holographic emulsion layers from moisture to maximize holographic life.

SUMMARY OF THE INVENTION

In order to aid in the understanding of this invention, it can be stated in essentially summary form that it is directed to a hologram stabilizing assembly and method wherein one side of the assembly comprises four layers, excluding adhesive if any, with the bottom layer being the dichromated gelatin film holographic element. The other side of the gelatin film holographic element is protected by another moisture barrier, such as another stack of such layers. Successively on the one side are positioned a hydrophobic moisture-barrier layer, a water absorbent layer, and another hydrophobic moisture-barrier layer so that any moisture penetrating the outer hydrophobic moisture-barrier layer is absorbed in the water absorbent layer and the holographic film is protected from the moisture in the getter layer by the inner hydrophobic moisture-barrier layer.

It is, thus, a purpose and advantage of this invention to provide a hologram stabilizing assembly wherein a water absorbent layer is provided in the assembly on one or both sides of the holographic layer to absorb moisture before it penetrates to the holographic film layer.

It is another purpose and advantage to enhance life of a holographic image in a hydrophilic hologram film by protecting the holographic film from moisture by means of both hydrophilic and hydrophobic layers.

It is another purpose and advantage to provide a hologram stabilizing assembly which is useful to protect either reflection holograms or transmission holograms by protecting the hydrophilic hologram film from moisture.

It is a further purpose and advantage of this invention to provide a method whereby an assembly is achieved for the protection against water vapor on a hologram to prevent swelling of the hologram and consequent optical distortion and change of characteristics.

Other purposes and advantages of this invention will become apparent from a study of the following portion of the specification, the claims, and the attached drawings.

DESCRIPTION OF THE PREFERRED EMBODIMENT

Figure 1:
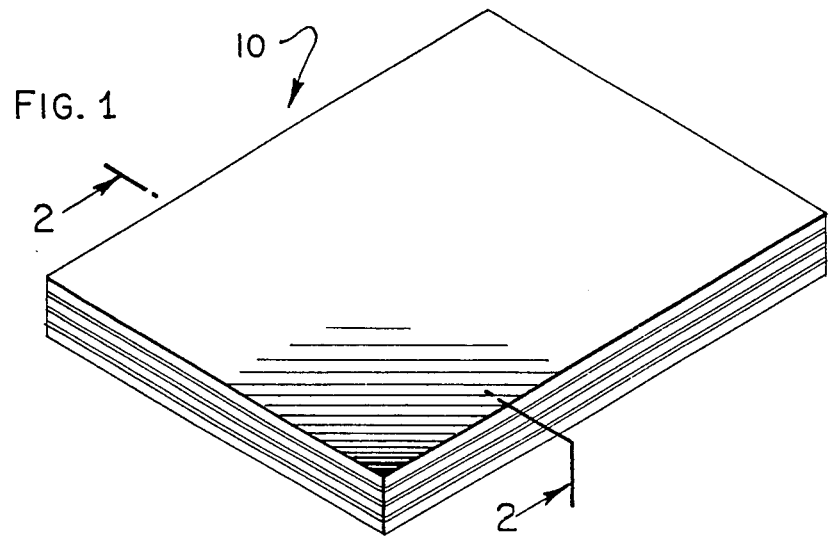
FIG. 1 is an isometric view of a first preferred embodiment of the hologram stabilizing assembly of this invention.
Figure 2:
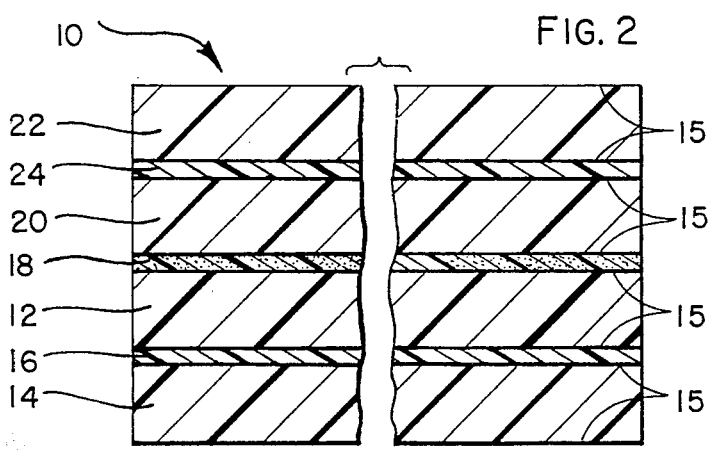
FIG. 2 is an enlarged section taken generally along the line 2—2 of FIG. 1, with parts broken away.

The first preferred embodiment of the hologram stabilizing assembly of this invention is generally indicated as 10 in FIGS. 1 and 2. The finished hologram assembly 10 comprises seven layers plus six glue layers. The structure starts as a pre-holographic assembly wherein the substrate is formed of inner and outer hydrophobic substrate layers 12 and 14. The hydrophobic substrate layers may comprise any of the optically transparent polymer materials suitable in the art and include materials such as cellulose acetate, polystyrene, polyester, poly-(methyl methacrylate) and polycarbonate and co-polymers containing these polymers. The polymer of allyl diglycol carbonate (available from PPG Industries, Inc., Pittsburgh, Pa. under the trade designation CR-39) appears particularly well-suited in the practice of the invention. Aclar brand of fluoropolymer by Allied Corp. may be the optimum material for thin layers (such as 0.005 thick). Together these substrate layers 12 and 14 are sufficiently strong as to provide physical support to the pre-holographic element. The purpose of the hydrophobic layers is to inhibit the transfer of water moisture from the environment into the emulsion layer. The coating of a moisture barrier 15 onto one or both sides of the hydrophobic layers enhances the moisture transfer resistance. For example, a polycarbonate hydrophobic layer may carry a vapor-deposited layer of silicon dioxide, tin oxide or indium oxide. Such a vapor-deposited water vapor barrier coating would decrease water vapor transfer to enhance life of the completed holographic assembly.

The hydrophobic substrate layers are transparent because exposure therethrough is necessary to expose the emulsion. Should the hologram be used as a reflection hologram, an opaque base can be later applied.

Between the hydrophobic substrate layer is positioned transparent water absorbent substrate layer 16, which is about 0.005 to 0.040 inches (125 to 1,000 microns) thick. The water absorbent layer 16 is preferably the same hydrophilic organic colloid as the emulsion vehicle in emulsion layer 18. The inner and outer substrate hydrophobic layers, the substrate water absorbent layer 16, and the emulsion layer 18 are secured together by means of an optical adhesive such as Norland 61 manufactured by Norland Products Inc., 695 Joyce Kilmer Avenue, New Brunswick, N.J. 08902. The inner and outer hydrophobic substrates 12 and 14 are in the order of 0.005 inch (125 microns) thick. This is adequate support for emulsion layer 18.

The emulsion layer 18 is formed by processes well-known in the art, and thus such processes do not form a part of this invention. (See e.g., Vol. 12, Applied Optics, pp. 232–242 (1973) and Vol. 8, Applied Optics, pp. 2346–2348 (1969).)

The hydrophilic, photosensitive layer comprises emulsions which utilize hydrophilic organic colloids as an emulsion vehicle such as dichromated gelatin, photographic silver halide emulsion, diazo gelatin, photopolymers such as Polaroid Corporation DMP-128, and other gelatin-based photosensitive materials. The thickness of the photosensitive layer ranges from about 1 to 100 micron, or more particularly from 0.005 to 0.040 inches (125 to 1,000 microns), as is well-known. Generally, the thicker the layer, the more efficient in diffracting light. On the other hand, the thinner the layer, the larger the viewable angle and the larger the spectral bandwidth. Photosensitive layers for conventional holograms typically range from about 6 to 20 micron, as is well-known.

To fabricate a hologram, the pre-holographic element is further processed by exposing the photosensitive layer, either directly or through the substrate layers, to an actinic interference pattern to record a latent image thereon. The interference pattern may be generated by a picture, one or more lenses, or other suitable sources employing techniques known in the art. The photosensitive layer is then developed by methods known in the art to obtain the recorded latent image. In the case of a photosensitive layer comprising dichromated gelatin, washing with water and dehydrating with alcohol is used to develop the photosensitive layer (i.e., amplify the latent image).

After the holographic emulsion layer 18 is exposed and developed, it is protected by the application of inner and outer hydrophobic cover layers 20 and 22 which carry second water absorbent layer 24 therebetween. Again, optical adhesive is used to secure the layers together. The optical adhesive between the layers in the assembly 10 is illustrated in FIG. 2 by heavy lines. After completion, the edges are sealed to prevent edge entry of moisture. Norland 61 adhesive applied to the edges with a thickness of 0.020 to 0.040 inch provides adequate edge sealing. Edge sealing can also be accomplished with polysulfide cement and aluminum tape.

The Norland 61 adhesive is also hydrophilic and may be employed as adhesive in place of the emulsion vehicle. While the gelatin emulsion will stick to the hydrophobic layers, it is not a sufficiently good adhesive to use in a hologram assemby during processing.

Figure 3:
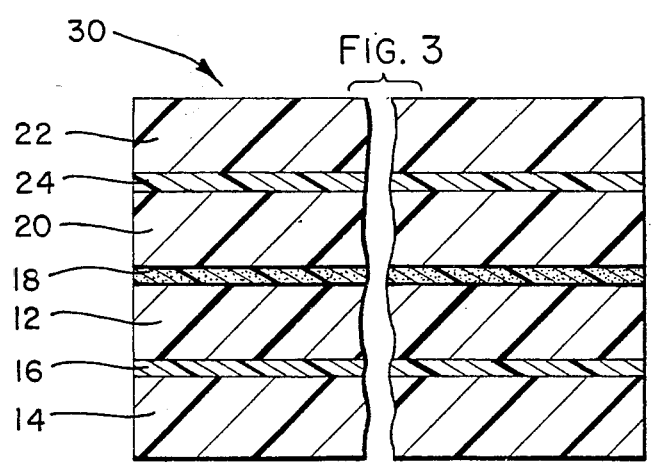
FIG. 3 is a view similar to FIG. 2 showing a second preferred embodiment of the hologram stabilizing assembly of this invention.

The holographic assembly 30 in FIG. 3 is made up of the same hydrophobic layers as the assembly 10, but the adhesive is thick and serves also as the water absorbent layer, or the water absorbent layer serves as the adhesive. In the case of the holographic assembly 30, the water absorbent layers 16 and 24 are adhesive (such as Norland 61) which holds the structure together. In the structure of FIG. 3, the water absorbent layers 16 and 24 are from 0.005 to 0.040 inch thick (125 to 1,000 microns), while the hydrophobic layers 14, 12, 20 and 22 are in the order 0.005 inch (125 microns) thick. The dividing lines between the layers can also be considered to be the moisture barrier coatings, as described above.

Even though the hydrophobic layers are resistant to the penetration of moisture, water vapor does diffuse therethrough. In view of the fact that it is the emulsion layer which is to be protected, the upper and lower inner hydrophobic layers should be the same thickness and the upper and lower outer hydrophobic layers should be the same thickness to define the same rate of water vapor diffusion. It is upper and lower water absorbent layers 24 and 16 which act as a getter to capture the water vapor which is passed respectively through the upper and lower outer hydrophobic layers 22 and 14. The getter layers act as a reservoir to collect moisture passing through the outer hydrophobic layers. Only when the water absorbent layers fill is there significant water vapor pressure against the inner hydrophobic layer. The image layer is protected as long as the water absorbent layers will receive moisture. In order to protect the emulsion layer 18 from the moisture captured in the water absorbent layers 24 and 16, the upper and lower inner hydrophobic layers 20 and 12 are provided.

Moisture transmission rate through the protective barrier was determined by measuring the peak reflection wavelength of a Lipmann grating recorded in the photosensitive dichromated gelatin layer. As water diffuses through the substrate and protective cover, it is absorbed by the dichromated gelatin film causing it to change thickness. The thickness change varies the separation between the Bragg planes in the Lipmann grating causing a shift in the peak reflective wavelength that the grating diffracts. Knowing the original thickness, the water transmission rate can then be quantitatively determined from reflective wavelength shift measurements.

The table below lists the wavelength change (in Angstroms) in dichromated gelatin holograms due to absorption of water. These test samples are single-sided with ¼ inch glass used as the substrate. Thus, they show half the water absorption which would be experienced in a prototype assembly. In actual use, the substrate would have the same series of layers as the cover layers.

| WAVELENGTH CHANGE IN DICHROMATED GELATIN HOLOGRAMS DUE TO ABSORPTION OF WATER | |
|---|---|
| Test Unit | Wavelength Drift Rate Å/Day |
| Hydrophobic layer<br>Hydrophilic emulsion layer<br>¼" glass layer | 10.2 |
| Hydrophobic layer<br>Water absorbent layer<br>Hydrophilic emulsion layer<br>¼" glass layer<br>(with adhesive between all layers) | 7.2 |
| Hydrophobic layer<br>Water absorbent layer<br>⅛" polycarbonate hydrophobic layer<br>Hydrophilic emulsion layer<br>¼" glass layer | −0.03 |
| ¼ glass hydrophobic layer<br>Hydrophilic emulsion layer<br>¼ glass hydrophobic layer | 0.1 |

The extremely low (negative) number for the third sample shows the level of accuracy in the measurement technique. All measurements represent averages for several samples.

This invention has been described in its presently contemplated best mode, and it is clear that it is susceptible to numerous modifications, modes and embodiments within the ability of those skilled in the art and without the exercise of the inventive faculty. Accordingly, the scope of this invention is defined by the scope of the following claims.

What is claimed is:

1. A pre-holographic assembly comprising:
a first hydrophobic substrate layer;
a water absorbent layer positioned on said first hydrophobic substrate layer;
a second hydrophobic substrate layer positioned on said water absorbent layer; and
a photosensitive holographic emulsion layer positioned on said second hydrophobic substrate layer so that said photosensitive holographic emulsion layer can be exposed and developed to provide a hydrophobic image layer, said first and second substrate layers being sufficiently strong to support said emulsion layer.

2. The pre-holographic assembly of claim 1 wherein said hydrophobic layers are synthetic polymer composition material layers.

3. The pre-holographic assembly of claim 2 wherein there is a moisture barrier coating on at least one side of one of said hydrophobic layers.

4. The pre-holographic assembly of claim 2 wherein said water absorbent layer and said photosensitive holographic emulsion layer are both gelatin layers.

5. The pre-holographic assembly of claim 2 wherein said synthetic polymer composition substrates are transparent.

6. The pre-holographic assembly of claim 1 wherein said water absorbent layer and said photosensitive holographic emulsion layer are both gelatin layers.

7. The pre-holographic assembly of claim 6 further including adhesive between said layers.

8. The pre-holographic assembly of claim 1 wherein said water absorbent layer is an adhesive.

9. The pre-holographic assembly of claim 1 further including adhesive between said layers.

10. A holographic assembly comprising:
 a first hydrophobic substrate layer;
 a water absorbent layer positioned on said first substrate;
 a second hydrophobic substrate layer positioned on said first water absorbent layer;
 a photosensitive holographic emulsion layer having a holographic image therein, said emulsion layer being hydrophilic;
 a first hydrophobic cover layer on said emulsion layer;
 a second water absorbent layer on said first hydrophobic cover layer; and
 a second hydrophobic cover on said second water absorbent layer, at least said first and second cover layers and said second water absorbent layer being transparent so that the holographic image on the emulsion layer can be viewed.

11. The holographic assembly of claim 10 wherein said substrate layers and said cover layers are made of synthetic polymer composition material.

12. The holographic assembly of claim 11 wherein at least one side of one of said hydrophobic subtrate layers and at least one side of one of said hydrophobic cover layers is coated with a moisture barrier.

13. The holographic assembly of claim 11 wherein said first and second water absorbent layers are gelatin layers.

14. The holographic assembly of claim 11 further including adhesive between said layers to adhesively secure said layers together.

15. The holographic assembly of claim 11 wherein said first and second substrate layers and said first and second cover layers are substantially equal in thickness to each other.

16. The holographic assembly of claim 10 wherein said first and second substrate layers and said first and second cover layers are all substantially transparent to visible light.

17. The holographic assembly of claim 10 wherein said first and second water absorbent layers are gelatin layers.

18. The method of fabricating a pre-holographic assembly comprising the steps of:
 providing a first hydrophobic substrate;
 depositing thereon a first water absorbent layer;
 depositing thereon a second hydrophobic substrate, with said first and second hydrophobic substrates being sufficiently strong to support the pre-holographic assembly; and
 depositing on the second hydrophobic substrate a photosensitive hydrophilic holographic layer.

19. The method of forming a holographic assembly from the pre-holographic assembly of claim 18 further including the steps of:
 exposing and developing a holographic image in the photosensitive layer to form an image layer;
 depositing a first hydrophobic transparent cover layer on the holographic image layer;
 depositing a second water absorbent layer on the first hydrophobic cover layer; and
 depositing a second hydrophobic transparent cover layer on the second water absorbent layer so that the holographic image can be observed through the cover layers.

20. The holographic assembly of claim 19 wherein the depositing steps include: applying an adhesive to each successive layer.

* * * * *